United States Patent [19]

Hardison

[11] Patent Number: 5,160,714

[45] Date of Patent: * Nov. 3, 1992

[54] CONTINUOUS AUTOCIRCULATION, MULTIPLE ZONE MASS TRANSFER APPARATUS AND METHOD

[75] Inventor: Leslie C. Hardison, Barrington, Ill.

[73] Assignee: ARI Technologies, Inc., Palatine, Ill.

[ * ] Notice: The portion of the term of this patent subsequent to Jun. 30, 2009 has been disclaimed.

[21] Appl. No.: 682,598

[22] Filed: Apr. 8, 1991

[51] Int. Cl.$^5$ .............................................. C01B 17/16
[52] U.S. Cl. .................................... 423/220; 423/230; 423/231; 423/573.1; 423/576.4; 422/191
[58] Field of Search ............... 423/576.2, 576.4, 576.5, 423/576.6, 576.8, 573.1, DIG. 14, 220, 230, 231; 422/191, 193, 194, 169

[56] References Cited

U.S. PATENT DOCUMENTS

| | | | |
|---|---|---|---|
| 2,142,406 | 1/1939 | Nonhebel et al. | 422/169 |
| 3,638,708 | 2/1972 | Farin | 159/47 WL |
| 3,759,669 | 9/1973 | Aaron et al. | 422/231 |
| 3,876,537 | 4/1975 | Dulin et al. | 210/15 |
| 3,887,682 | 6/1975 | Kumata et al. | 423/232 |
| 4,009,251 | 2/1977 | Meuly | 423/573 G |
| 4,083,944 | 4/1978 | Chalmers | 423/567 A |
| 4,225,562 | 9/1980 | Anderson | 422/188 |
| 4,236,974 | 12/1980 | Kuhnlein | 203/11 |
| 4,238,462 | 12/1980 | Hardison | 423/224 |
| 4,375,450 | 3/1983 | Katagiri et al. | 422/170 |
| 4,482,524 | 11/1984 | Hardison | 422/170 |
| 4,622,212 | 11/1986 | McManus et al. | 423/226 |
| 4,844,881 | 7/1989 | Gens et al. | 423/574 R |
| 4,855,124 | 8/1989 | Matsuoka et al. | 423/547 L |
| 4,935,221 | 6/1990 | Bronfenbrenner et al. | 423/574 |
| 4,976,935 | 12/1990 | Lynn | 423/222 |

FOREIGN PATENT DOCUMENTS 54-39383 3/1979 Japan ................................. 422/194
1298861 12/1972 United Kingdom ........... 423/567 A

OTHER PUBLICATIONS

Leslie C. Hardison, "Hydrogen Sulfide: An Alternative To Claus", Chemical Engineering, Jan. 21, 1985.

Primary Examiner—Gary P. Straub
Assistant Examiner—Timothy C. Vanoy
Attorney, Agent, or Firm—Marshall, O'Toole, Gerstein, Murray & Bicknell

[57] ABSTRACT

An apparatus and method of contacting a liquid with different gases sequentially in separate mass transfer zones within a single vessel, the mass transfer zones operatively connected in liquid communication with each other, including intimately contacting the liquid with a first process gas in cocurrent flow in a first mass transfer zone to effect mass transfer between the first liquid and the process gas, and introducing the liquid into a second mass transfer zone with a second gas, different from the first gas, in cocurrent flow with the second liquid, thereby effecting mass transfer between the second liquid and the second gas. The rate of flow of the liquid from said first mass transfer zone to second mass transfer zone and recirculation to the first mass transfer zone is motivated by the difference in density of the contents of the liquid phase portion of each mass transfer zone and a following liquid downcomer or flow channel connecting it to the next sequential mass transfer zone, such that after passing through the last mass transfer zone, the liquid recirculates to the first mass transfer zone. The apparatus and method are ideally suited to carrying out the process of hydrogen sulfide removal from gases by means of an air-regenerated liquid redox catalyst, such as chelated iron.

21 Claims, 6 Drawing Sheets

CONTINUOUS AUTOCIRCULATION, MULTIPLE ZONE MASS TRANSFER APPARATUS AND METHOD

FIELD OF THE INVENTION

The present invention is directed to a method and apparatus for contacting a liquid with a plurality of different gases, sequentially, in a gas-liquid contact apparatus having a plurality of gas-liquid contact zones, each in fluid communication with at least one other gas-liquid contact zone within a single vessel for mass transfer between the gases and the liquid, in such a manner that solution circulation is created by density differences between gas-liquid contact zones and intermediate liquid-filled communication chambers, without the use of a solution circulation pump. More particularly, the present invention is directed to a method and apparatus for continuously removing hydrogen sulfide gas ($H_2S$) from a fluid stream by reacting the fluid stream with a catalytic redox polyvalent metal solution for $H_2S$ gas removal, and continuously regenerating the catalytic solution by reaction with an oxygen-containing gas. The process is particularly suited to treating process gas streams having a relatively high $H_2S$ concentration, e.g., at least 1% by weight, at a relatively low pressure, e.g., less than 1 bar gage, but is useful for process gas streams at any pressure.

BACKGROUND OF THE INVENTION AND PRIOR ART

The method and apparatus of the present invention are improvements over the autocirculation method and apparatus disclosed in my prior U.S. Pat. No. 4,238,462 and is useful for gas-liquid mass transfer where a liquid is contacted with two different gases in separate contact zones. In a catalytic process for removing hydrogen sulfide gas ($H_2S$) from a fluid stream using a ferric iron catalyst, such as a ferric iron chelate, the ferric iron is reduced to the ferrous state when reacted with hydrogen sulfide. The series of reactions involved in catalytically oxidizing hydrogen sulfide gas to form elemental sulfur using a ferric iron chelate catalytic reagent can be represented by the following equations, as set forth in my prior U.S. Pat. No. 4,238,462:

$$H_2S(Gas) + H_2O(Liquid) \rightleftharpoons H_2S(Aqueous) + H_2O(Liquid)$$

$$H_2S(Aqueous) \rightleftharpoons H^+ + HS^-$$

$$HS^- \rightleftharpoons H^+ + S^=$$

$$S^= + 2(Fe^*Chelate)^{+3} \rightarrow S°(Solid) + (Fe^*Chelate)^{+2}$$

By combining these equations, the resulting equation is:

$$H_2S(gas) + 2(Fe^*Chelate)^{+3} \rightarrow 2H^+ + 2(Fe^*Chelate)^{+2} + S°$$

In order to have an economical, workable process to effect catalytic oxidation of the hydrogen sulfide, it is essential that the hydrogen sulfide gas be brought continuously into intimate contact with the chelated iron solution and that the ferrous iron chelate formed in the above described manner be continuously regenerated by oxidizing to ferric iron chelate by intimate contact with dissolved oxygen, preferably derived from ambient air. The series of reactions that take place when regenerating the required ferric iron chelate can be represented by the following equations:

$$O_2(Gas) + 2H_2O \rightleftharpoons O_2(Aqueous) + 2H_2O$$

$$O_2(Aqueous) + 2H_2O + 4(Fe^*Chelate) + 2 \rightarrow 4(OH^-) + 4(Fe^*Chelate)^3$$

By combining these equations, the resulting equation is:

$$\tfrac{1}{2}O_2(Gas) + H_2O + 2(Fe^*Chelate)^{+2} \rightarrow 2(OH)^- + 2(Fe^*Chelate)^{+3}$$

It will be evident from the foregoing equations that theoretically two moles of ferric iron must be supplied to the reaction zone in which the hydrogen sulfide gas is oxidized to form elemental sulfur for each mole of hydrogen sulfide gas treated, and in actual practice considerably more than the theoretical amount of iron is used. In a continuous process of removing hydrogen sulfide by contact with a catalytic ferric iron solution, the catalytic solution is circulated continuously between an absorber zone, where the $H_2S$ is absorbed by the catalytic ferric iron chelate solution, and the solution reduced to ferrous iron in an oxidizer zone where the reduced ferrous iron is oxidized back to the ferric iron state. In order to avoid using high concentrations of iron in the catalytic solution, the rate of circulation should be high.

In the past, vanadium redox catalysts could not be used in an autocirculation process and apparatus, such as disclosed in my prior U.S. Pat. No. 4,238,462 because the vanadium redox reactions require more time to complete the $H_2S$ oxidation reaction in the absence of dissolved oxygen before the solution exiting the absorber is exposed to oxygen.

The economics and workability of the Stretford process have depended upon a large volume of the metal vanadate redox solution. The reduced metal vanadate, after absorption of the $H_2S$ (as $HS^-$ or $S^=$) to form the metal vanadate in the +4 valance state is continuously regenerated to the +5 valance state by contact with dissolved oxygen for continuous use of the oxidized metal vanadate in the absorption zone to remove additional $H_2S$ as elemental sulfur. The Stretford process chemistry is typically summarized according to the following steps:

Absorption and dissociation of $H_2S$ into alkali:

$$2H_2S(g) + 2Na_2CO_3 \rightarrow 2NaHS + 2NaHCO_3;$$

Bisulfide oxidation with metavanadate to form elemental sulfur and reduced vanadium:

$$2NaHS + 4NaVO_3 + H_2O \rightarrow Na_2V_4O_9 + 4NaOH + 2S;$$

and

Vanadium reoxidation by dissolved molecular oxygen in the presence of ADA:

$$Na_2V_4O_9 + 2NaOH + O_2 \xrightarrow[H_2ADA]{ADA} 4NaVO_3 + H_2O$$

Prior to the autocirculation method and apparatus disclosed in my U.S. Pat. No. 4,238,462, the catalytic oxidation-reduction reactions for continuously removing hydrogen sulfide, or the like, from a fluid stream were carried out concurrently in the same reaction vessel by means of a process which can be referred to as an aerobic operation, or by means of a process in which the oxidation and reduction steps were carried out in separate reaction vessels in what can be referred to as an anaerobic operation (see U.S. Pat. No. 3,897,219). While an anaerobic operation may have certain advantages over an aerobic operation for treating some gas streams which must be recovered after $H_2S$ removal, there is the extra expense involved in providing additional equipment, and the continuous pumping of large volumes of liquid from one vessel to the other increases operating costs.

The method and apparatus described in my U.S. Pat. No. 4,238,462 has been commercially successful, but the commercial use of that method and apparatus suffers from several disadvantages including some lack of control of residence time for gas-liquid contact in each of the reaction zones; no provision for liquid flow control; a relatively high thiosulfate production rate—4 to 6 percent by weight of the sulfur being converted to thiosulfate; and relatively high iron losses when the method and apparatus are used in the preferred embodiment for removing hydrogen sulfide from a gas stream.

Further, one skilled in the art will see that the autocirculation process as practiced commercially U.S. Pat. No. 4,238,462 comprises a well-stirred oxidation section, in which the composition of the bulk of the solution in the oxidizer is of necessity substantially the same as that circulating into the absorption zone. That is, it is nearly completely oxidized, so has a relatively high oxygen partial pressure and presents a minimum driving force for dissolution of oxygen in the solution.

In accordance with the process and apparatus of the present invention, the quantity of oxygen dispersed in a last oxidation stage can be controlled to prevent a substantial excess of dissolved oxygen in the polyvalent metal redox solution entering the absorption stage of the process so that sulfate, thiosulfate and other salts will be formed in the absorption zone of the process to a much lesser extent, enabling the process to be carried out at a more efficient, higher pH with little or no need for periodic addition of alkali to the polyvalent metal redox solution.

Finally, the autocirculation apparatus as presently practiced is not applicable to the Stretford process and such redox processes which rely on relatively slow reactions between the oxidized metal redox catalyst and dissolved $HS^-$ or $S^=$ ions because there is no effective residence time for the solution leaving the absorber before it enters the oxidizer. The absence of sufficient residence time contributes significantly to the formation of thiosulfate and sulfate salts by permitting the residual $HS^-$ and $S^=$ ions to enter the oxygen-rich oxidation zone where the non-specific side reactions between these species and dissolved oxygen can take place. The present method and apparatus overcomes this limitation, and makes possible full use of the autocirculation principle for Stretford and any other $H_2S$ removal process that uses a catalytic redox polyvalent metal solution that is reduced and oxidized for converting $H_2S$ to elemental sulfur, because the present invention provides for the insertion of a residence chamber through which the liquid exiting the absorber passes before entering the oxidizer. In the case of the LO-CAT ® process, a residence time of 10 to 60 seconds may be adequate, whereas in the case of the Stretford chemistry 10 to 60 minutes may be required.

SUMMARY OF THE INVENTION

The above and other disadvantages have been overcome in accordance with the method and apparatus of the present invention by providing an apparatus having a plurality of gas-liquid contact mass transfer zones or chambers in fluid communication with one another, including a first gas-liquid mass transfer zone or chamber for contact of a liquid with a first or process gas, and a residence chamber in fluid communication with the first gas-liquid mass transfer zone or chamber to aid in controlling circulation of the mass transferred and/or mass transferring solution from the first mass transfer zone to a second mass transfer zone. Cross flow of solution from the residence chamber through a valve or other circulation control device to the second gas-liquid mass transfer zone or chamber provides controlled, continuous and sequential gas-liquid contact with two or more different gases in separate contact zones within a single vessel.

Each of the first and second gas-liquid mass transfer zones or chambers may be divided into two or more separate contact stages for continued gas-liquid contact. The separate stages of each gas-liquid mass transfer zone or chamber are in sequential fluid communication, one with another through intermediate flow channels or communication chambers in which no additional gas is dispersed in the liquid. The flow channels are formed by an inverted weir extending downwardly from an upper portion of a downstream end of one stage and a submerged weir extending upwardly from an upstream end of the succeeding stage, the weirs being horizontally spaced and vertically overlapping within the liquid. In accordance with the preferred embodiment, a residence chamber separates the first gas-liquid mass transfer zone from the second gas-liquid mass transfer zone to provide controlled residence time and controlled circulation of solution between the two mass transfer zones for sequential contact with a different gas in each zone. In this manner, reliable, controlled circulation of solution is achieved regardless of the desired rate of flow of each process gas in each zone. In the application to liquid redox processes for oxidation of $H_2S$ to sulfur and water, there is little or no thiosulfate production since substantially all of the $HS^-$ and $S^=$ ions are converted to elemental sulfur in the residence chamber or in the cross flow conduit by reaction with the oxidized polyvalent metal ions prior to oxidation of the polyvalent metal ions in the oxidizer zone, and due to the ability to control the dissolved oxygen in the polyvalent metal redox solution entering the absorption chamber; and the first and/or second gas-liquid mass transfer zones can be separated into stages to minimize the total volume required for each mass transfer zone.

Further advantages over the method and apparatus set forth in U.S. Pat. No. 4,238,462 include ease of segregation of the various gases. In the liquid redox $H_2S$ oxidation process, spent air and spent process gas flows can be easily separated so the $CO_2$ in the case of sweetening of a $CO_2-H_2S$ gas as might be derived from an amine gas sweetening process in a natural gas treating plant or other hydrocarbon or inert gas content of a clean process gas can, when economically feasible, be recovered, and to minimize the amount of spent air that is combined with sour process gas needing scrubbing or incineration; adequate driving forces for circulation of the solution are achieved at lower air rates per square foot of oxidation zone area without requiring pumping between gas-liquid contact zones; there is no possibility of circulation going the wrong direction if one or the other of the gas flows varies from the design rate; and there can be a substantial pressure difference between the various gas-liquid contact chambers to accommodate pressure requirements of downstream processing equipment.

There is a further advantage which may be significant in terms of application to other chemical systems. With the method and apparatus of the present invention, the Stretford process, or any other mass transfer process requiring liquid contact with two or more different gases can be used, such as Shafer, Unisulf, and the like, or any other gas-liquid contact mass transfer process that requires substantial residence time.

Accordingly, one aspect of the present invention is to provide a method and apparatus for causing mass transfer between a liquid and a plurality of different gases or gases within separate mass transfer zones within a single vessel.

Another aspect of the present invention is to provide an autocirculation method and apparatus for continuously removing hydrogen sulfide ($H_2S$) gas from a process gas stream by intimate contact with a catalytic polyvalent metal redox solution in one mass transfer zone and continuously regenerating the catalytic solution within the same vessel by intimate contact with an oxidizing gas in a separate mass transfer zone.

Another aspect of the present invention is to provide an autocirculation method and apparatus for continuously removing hydrogen sulfide ($H_2S$) gas from a sour process gas stream without conversion of the $H_2S$ to significant levels of a metal thiosulfate (e.g., $Na_2S_2O_3$), generally less than about 5% by weight of the sulfur converted to thiosulfate, and preferably less than 1% by weight.

A further aspect of the present invention is to provide an autocirculation method and apparatus for continuously removing hydrogen sulfide ($H_2S$) gas from an $H_2S$ containing process gas by intimate contact of the gas with an iron or vanadium catalyst solution, without significant iron or vanadium losses. Still another aspect of the present invention is to provide an autocirculation method and apparatus for continuously removing hydrogen sulfide ($H_2S$) gas from an $H_2S$ containing process gas by intimate contact of the process gas with a polyvalent metal redox catalyst solution in one mass transfer zone for absorption of the $H_2S$ gas into the catalyst solution, and regenerating the polyvalent metal catalyst solution in a separate mass transfer zone in the same vessel, while providing a residence chamber between the two mass transfer zones and liquid flow control between the two mass transfer zones.

BRIEF DESCRIPTION OF THE DRAWINGS

The above and other aspects and advantages of the present invention will become more apparent from the following detailed description of the invention, taken in conjunction with the drawings, wherein.

DETAILED DESCRIPTION OF THE PREFERRED EMBODIMENTS

Figure 1:
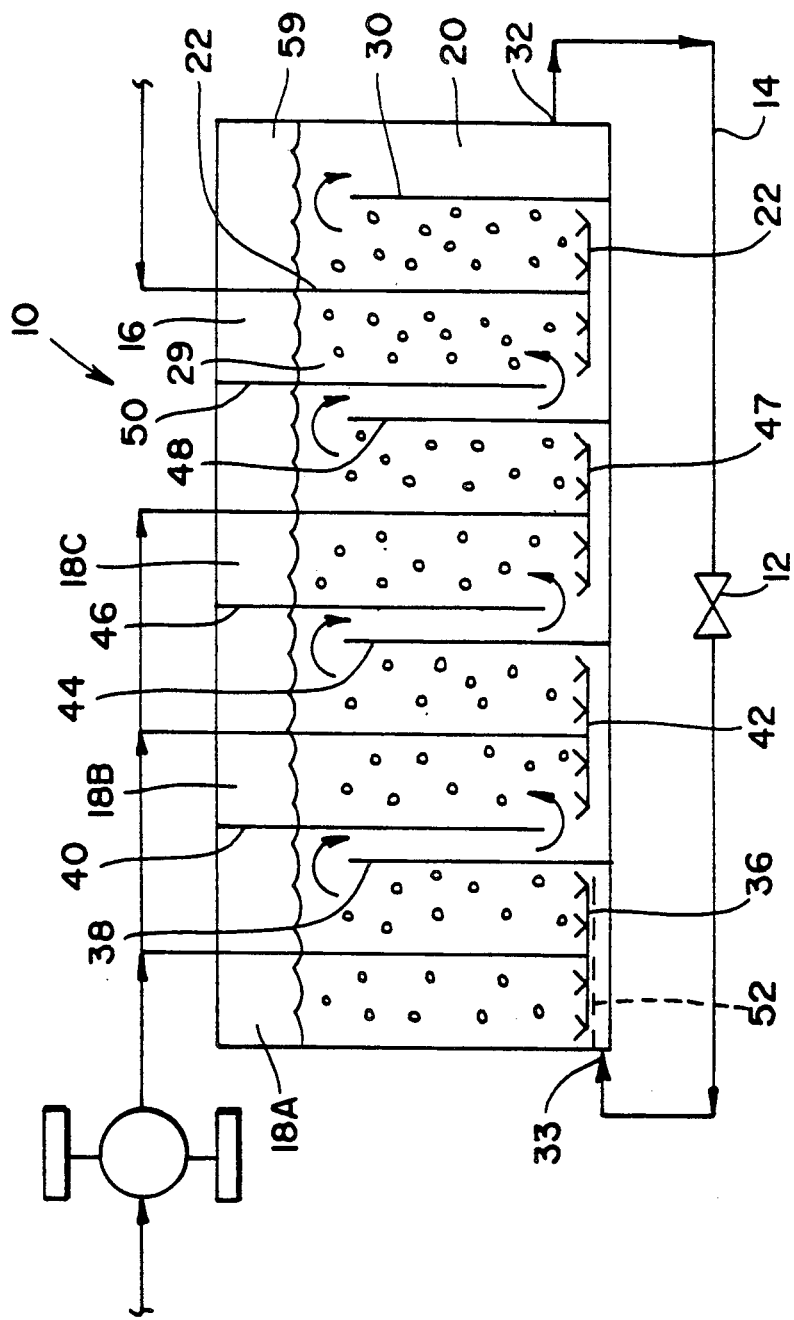
FIG. 1 is a side view of one embodiment of the gas-liquid mass transfer oxidizer/absorber vessel of the present invention.

Turning now to the drawings, and initially to FIG. 1, a cross-flow autocirculator, generally designated 10, as shown in FIG. 1, was designed for a treating capacity of about 1 pound/hr sulfur, to test a 3-stage oxidation autocirculator having a liquid flow control ball valve 12 disposed in a conduit 14 between a first mass transfer zone, or absorber chamber, generally designated 16, and a second mass transfer zone, or oxidizer chamber, generally designated 18. The oxidizer chamber 18 includes three separated oxidation stages 18A, 18B and 18C, for regeneration of the catalyst solution. A residence chamber 20 is disposed between and in fluid communication with both the first mass transfer zone, or absorber chamber 16, and the second mass transfer zone, or oxidizer zone 18, via conduit 14.

The autocirculator 10, shown in FIG. 1, is a 110 gallon capacity rectangular acrylic tank, divided by baffles into absorber chamber 16, three oxidizer chambers 18A, 18B, 18C, and residence chamber 20.

The absorber chamber 16 is connected in fluid communication through the residence chamber 20 to the first stage 18A of the oxidizer zone 18 via a 3 inch, internal diameter transparent hose 14. Circulation is driven by the liquid density differences induced by aeration, as disclosed in my prior U.S. Pat. No. 4,238,462, hereby incorporated by reference. $H_2S$ rich gas is introduced at the bottom of the absorber through sparger 22 in the absorber chamber 16 for intimate contact with liquid ferric iron chelate catalyst solution 29. The $H_2S$ rises along with oxidized catalyst solution from the third or last stage 18C of oxidizer zone 18 to absorption zone 16 and, after the oxidized catalyst solution has absorbed $H_2S$ from the process gas in absorption zone 16, the $H_2S$-laden liquid catalyst solution flows over the baffle 30 separating the absorber chamber 16 from the residence chamber 20, and flows through outlet 32, conduit 14, and ball valve 12, to the first oxidizer stage 18A, through inlet 33. In a preferred embodiment, a sloped plate (not shown) 34 forms a floor of residence chamber 20 to direct any settled sulfur to the residence chamber outlet 32.

The $H_2S$-laden liquid catalyst in the first oxidizer stage 18A is oxidized by air flowing through sparger 36 and flows over baffle 38 and under baffle 40 to the second stage 18B of oxidizer 18. The partially oxidized solution in the second stage 18B is further oxidized by air flowing through sparger 42 and flows over baffle 44, and under baffle 46 to the third stage 18C of oxidizer 18, for further oxidation with air from sparger 47. From the third oxidation stage 18C, the catalyst flows over baffle 48, and under baffle 50 to the absorber chamber 16.

The catalyst enters the first oxidation stage 18A through an equal area transition plate 52 to spread the flow from the 3 inch hose along the bottom center of the first oxidation stage 18A.

Spent oxidation air is vented from the top of each oxidizer stage 18A, 18B and 18C through outlet conduits (not shown). Also, an overhead space 59 above absorber 16 is flushed with air and the overhead space vented. All vented gases can be treated prior to release to the atmosphere. Ambient H2S data showed that H2S concentrations were less than 2 parts per million, and usually less that 0.25 parts per million at steady state.

Figure 2:
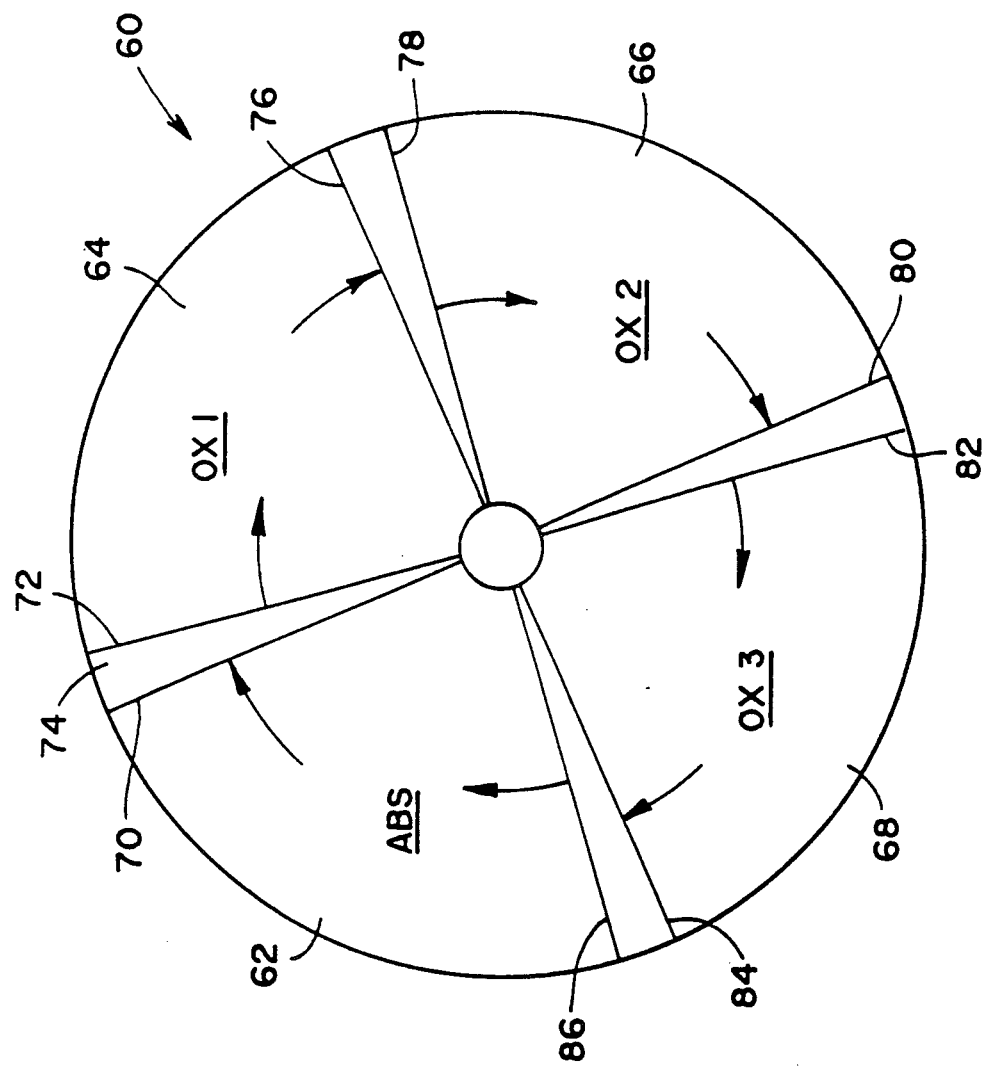
FIG. 2 is a top view of another embodiment of the gas-liquid mass transfer vessel of the present invention as a circular design.

The circular design of the process and apparatus shown in FIG. 2, generally designated 60, includes an absorber chamber 62 and an oxidizer chamber that is divided into three gas-separated stages, 64, 66 and 68. Horizontally and vertically spaced baffles 70 and 72, disposed between the absorber chamber 62 and the first oxidation stage 64 define a residence chamber 74 therebetween, for holding the H2S-laden polyvalent metal chelate solution prior to oxidation of the chelate solution.

The dimensions of the residence chamber 74 can be enlarged as desired to provide any desired residence time prior to oxidation of the polyvalent metal redox solution in the first oxidizer stage 64. Similarly, horizontally and vertically spaced baffles 76 and 78 are disposed between the first and second oxidizer stages 64 and 66; horizontally and vertically spaced baffles 80 and 82 are disposed between the second and third oxidizer stages 66 and 68; and horizontally and vertically spaced baffles 84 and 86 are disposed between the third oxidizer stage 68 and the absorber chamber 62. The spaced baffles 70 and 72; 75 and 78; 80 and 82; and 84 and 86 are constructed like those shown in FIG. 1 such that liquid from the absorber flows over baffle 70 and under baffle 72, and liquid from each successive oxidizer stage flows over its adjacent baffle 76, 80 and 84, and under the baffle 78, 82 or 86 adjacent the next succeeding zone. Like FIG. 1, the baffle that the liquid flows under prevents fluid communication above the liquid level between adjacent zones. Although not shown in FIG. 2, air spargers are disposed in oxidizer stages 64, 66 and 68, and a process gas sparger is disposed in absorber chamber 62. Preferably, the cylindrical absorber/oxidizer vessel shown in FIG. 2 has a planar, horizontally disposed floor.

Figure 3:
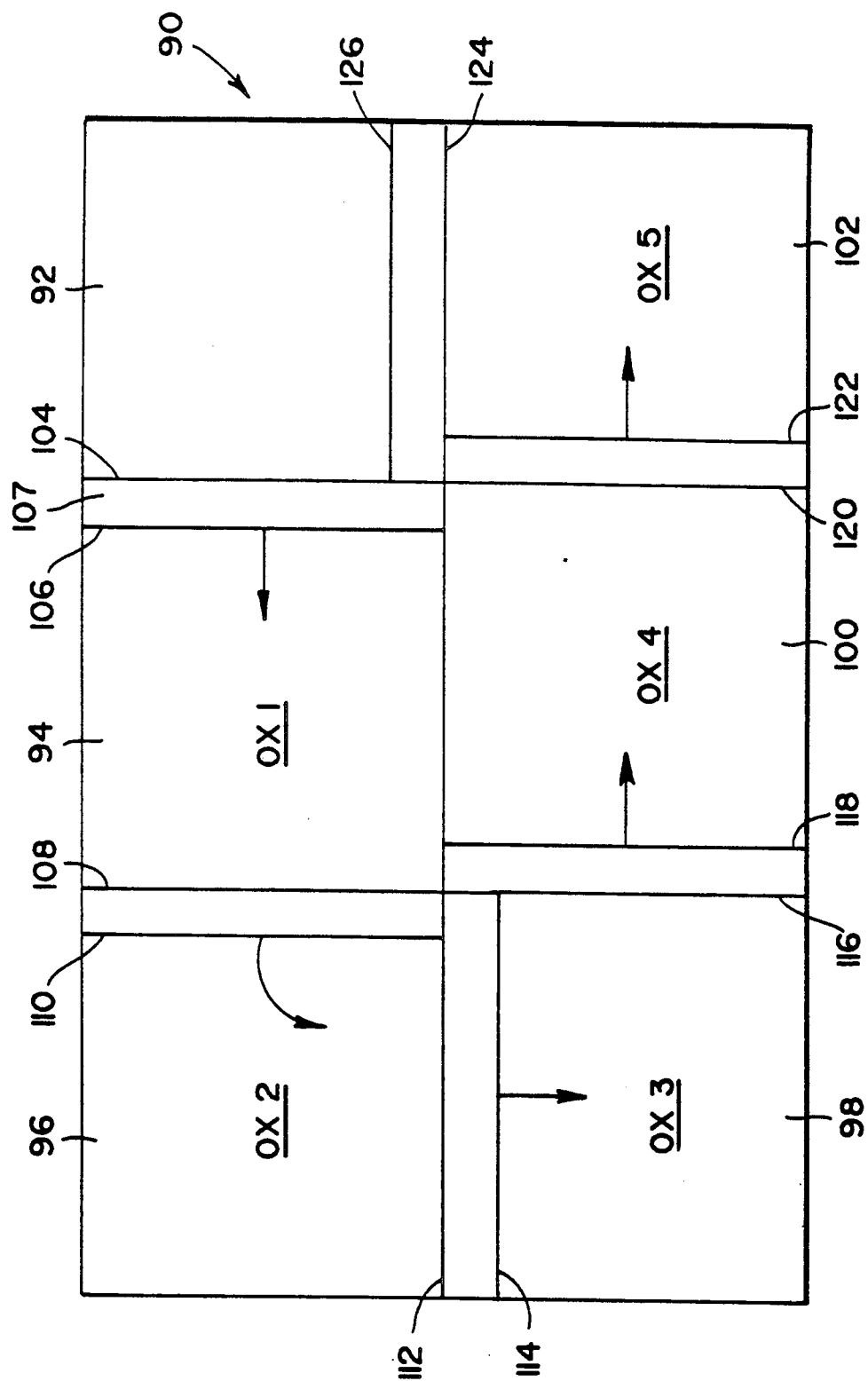
FIG. 3 is a top view of another embodiment of the gas-liquid mass transfer vessel of the present invention, as an alternative rectangular design providing additional oxidation stages.

The absorber/oxidizer vessel construction of FIG. 3, generally designated 90, is an enlarged version of that shown in FIG. 1 that provides additional oxidizer zones, and includes an absorber chamber 92 and a total of five oxidizer zones, 94, 96, 98, 100 and 102. Vertically and horizontally spaced baffles 104 and 106 separate absorber chamber 92 from the first oxidizer stage 94 and define a residence chamber 107 therebetween. Reduced polyvalent metal redox solution from absorber 92 flows over baffle 104 into residence chamber 107 and under baffle 106 into the first oxidizer stage 94. Baffle 106 prevents fluid communication above the liquid level between absorber chamber 92 and the first oxidizer stage 94. Similarly, horizontally and vertically spaced baffles 108 and 110; 112 and 114; 116 and 118; and 120 and 122 are constructed like those of FIG. 1 to prevent fluid communication above the liquid level between adjacent zones and to allow liquid from one zone or chamber to flow over its adjacent baffle 104, 108, 112, 116, 120 and 124, and under the baffle 106, 110, 114, 118, 122 or 126 adjacent the next succeeding zone. Although not shown in FIG. 3, air spargers are disposed in oxidizer stages 94, 96, 98, 100 and 102, and a process gas sparger is disposed in absorber chamber 92, the same as the spargers shown in FIG. 1.

The unit shown in FIG. 1 was constructed for experimental purposes to handle 1 pound/hr. sulfur and data were collected to show the marked improvement using the apparatus and method of the present invention, particularly utilizing the liquid flow control afforded by the valve 12 in conduit 14 between the first mass transfer zone 16 and the second mass transfer zone 18. This liquid flow control using the valve 12 was found to be a marked improvement over attempts to control liquid flow using only control of air flow through the air spargers 36, 42 and 47.

Figure 4:
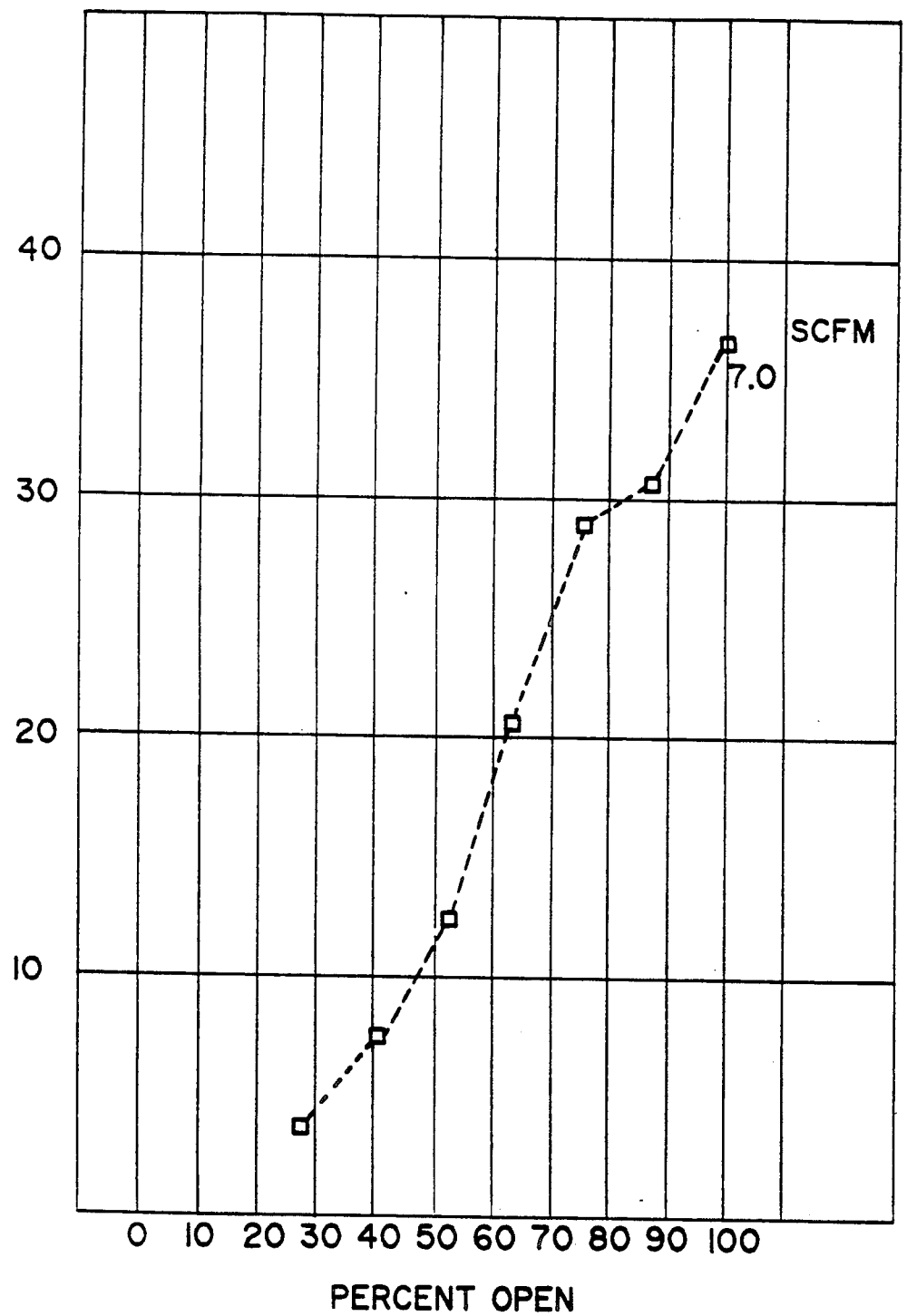
FIG. 4 is a calibration graph of liquid flow rate vs. valve setting for an air flow rate of 7.0 SCFM.

The ball valve 12 allows the catalyst flow rate to be adjusted. A calibration graph of liquid flow rate versus valve setting is given for various air flow rates in FIG. 4. Overhead sample ports (not shown) allow for vented H2S concentration to be determined and sample ports (not shown) at the bottom of each chamber allow for liquid sampling. A continuous 1-5 gpm stream was removed from the third oxidation stage 18C through a sample port and gravity filtered through a cloth bag for sulfur removal. The filtrate is automatically returned from the collection vessel by a pump activated by a level control (not shown). Solution temperatures were determined by installing a thermocouple in the first oxidation stage 18A in an overhead sample port.

The air spargers 36, 42, and 47 in each of the three oxidizer stages 18A, 18B and 18C of the oxidizer zone 18 were formed from pieces of slit and plugged silicone rubber oxidizer hoses attached to a capped one inch internal diameter pipe disposed along the bottom of each oxidizer stage 18A, 18B, and 18C. In the first stage 18A of the oxidizer 18, the sparger 36 is disposed immediately overlying the perforated distribution plate 52.

Air was initially supplied by a Becker pump type DT 3.25 with an 18 CFM capacity. A second such pump was added for later work. Air was regulated and measured using a King Instrument 0-8 SCFM rotameter for each oxidizer stage 18A, 18B and 18C. Overhead air in the absorber chamber was regulated with a Dwyer 5-50 SCFH rotameter. Air pressures were periodically determined using a quick-connect test guage. Air temperature was determined temporarily by fastening a thermocouple to the air hose.

An H2S sparger 60, in the absorber zone 16, was used to supply H2S as a pure gas from a cylinder supplied by Air Products. The regulator delivery pressure was set at 20 psig. Flow was regulated with Dwyer series RMB Rate-Master rotameters calibrated for air. Rotameters with ranges of 0-5, 0-10, and 3-20 SCFH were used, as required. During the testing, a pressure gauge was installed between the rotameter and spargers, and barometric pressure was read from a mercury barometer.

Samples were periodically withdrawn from each pilot plant chamber. The pH and oxidation reduction potential (ORP) were measured using a Cole-Parmer pH meter. A 20% or 50% NaOH solution was pumped into the catalyst via a tube inserted in a standpipe (not shown) in the conduit 14 flowing between the absorber zone 16 and the first stage 18A of the oxidizer zone 18. The NaOH pump rate was manually adjusted as necessary to maintain the pH between 8.0 and 8.3.

The oxidation reduction potential (ORP) probe was an Orion platinum redox electrode model 96-78, used with a 90-00-01 reference electrode filling solution.

EXPERIMENTAL OPERATION

Catalyst Formulation

The catalyst was prepared with a target Fe content of 500 mg/kg. Just prior to use, after concentration adjustments with water, the soluble Fe concentration was determined to be 445 mg/kg at the start of the experiment.

The liquid flow rate was determined at several air flow rates and control valve positions. The pilot plant (FIG. 1) was filled with water and the air sparger turned on to achieve flow. Dye was injected at one end of the straight, 3 inch I.D., transparent pipe installed between the absorber and oxidizer 1. Its time of travel through 32.7 inches, which was the length equivalent to 1 gallon, was determined. Flow was laminar; dye travel time was measured at the center of the pipe. From the velocity and pipe diameter, flow rates were determined in gpm. Valve positions were marked. It should be noted that setting this valve give a rather coarse flow adjustment with an accuracy of about ±2 gpm. With the valve wide open, the flow was 21 gpm with 5.3 SCFM air and 26.5 gpm with 7.6 SCFM air set on each rotameter. A calibration curve is shown in FIG. 3.

EXAMPLE 1

The 1 pound/hr sulfur autocirculation unit was run for 16 days with an initial thiosulfate concentration of about 1.7% $Na_2S_2O_3$. Air flow was maintained at about 5.2 SCFM on each oxidizer stage rotometer.

Conclusions Example 1 (1.7% $Na_2S_2O_3$)

Figure 5:
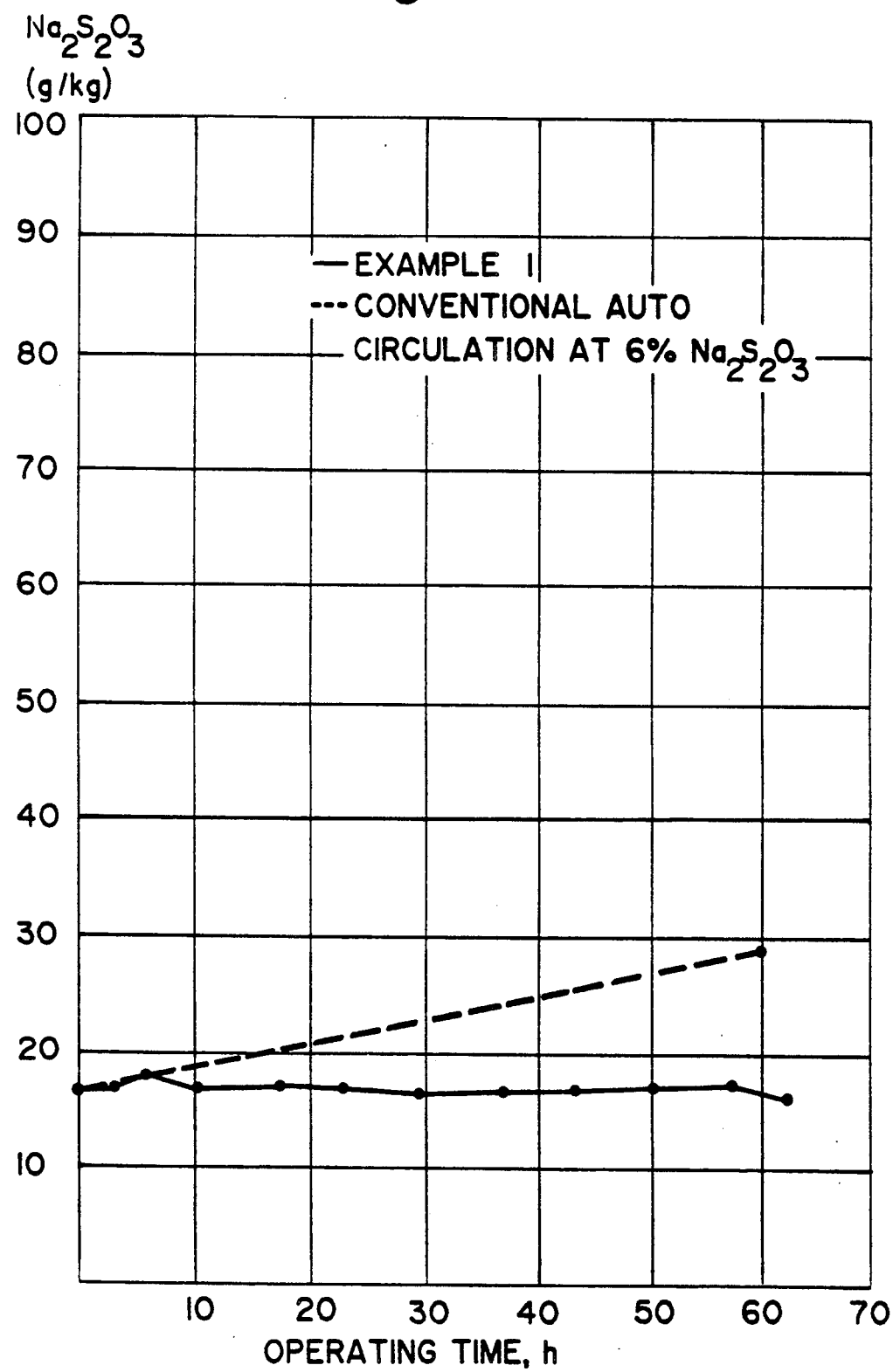
FIG. 5 is a graph of thiosulfate for Example 1 in comparison to a conventional autocirculation unit at 6% $Na_2S_2O_3$.
Figure 6:
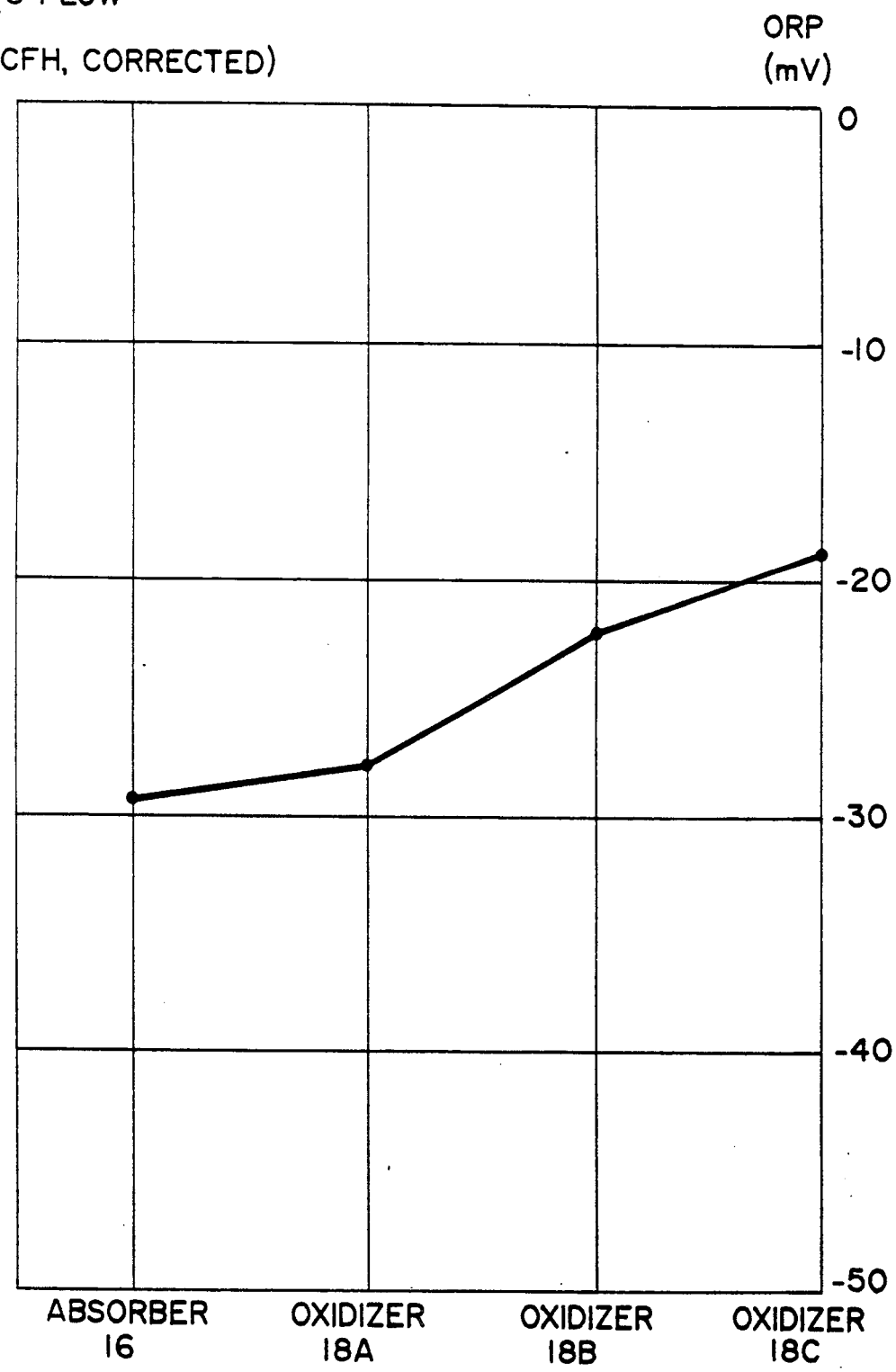
FIG. 6 is a graph showing oxidation reduction potential (ORP) vs. sample location wherein the $H_2S$ flow rate is 0.63 lb/hr.

1. No measurable thiosulfate was produced in the crossflow autocirculator. Less than 1% of the $H_2S$ was converted to thiosulfate.
2. The treatment capacity of the unit, when it was run with 14.2 SCFM of air, was 7.49 SCFH of $H_2S$ or 0.63 lb of sulfur per hour.
3. The pH and ORP were measured in each chamber regularly throughout Example 1. The pH was maintained between 7.9 and 8.3. There was little difference among absorber and oxidizer pHs. ORP's over the $H_2S$ flow range are plotted in FIG. 5.

In accordance with another feature of the present invention, some rich solution from any of the oxidizer stages 18B or 18C can be directed back into an earlier oxidizer stage, e.g., 18A, to allow for a desired initial build-up of thiosulfate to, e.g., about 10 to about 20% by weight from an initial concentration of, for example, about 1.5% by weight. Suitable pumps and by-pass conduits can be provided from oxidizer stage 18B and/or 18C back to oxidizer stage 18A to by-pass the residence chamber 59. Alternatively, air can be sparged into the solution within residence chamber 59 to allow for an initial build-up of thiosulfate to a desired initial concentration in the range of about 10% to about 20% by weight thiosulfate. Thereafter, the by-passing of residence chamber 59 or air sparging within residence chamber 59 can be stopped to maintain the thiosulfate level at a desired level, e.g., 10-20% by weight of the solution.

I claim:

1. In a continuous process for intimate contact of a liquid reagent sequentially with a process gas and a second gas in a vessel including a first mass transfer zone including one or more mass transfer stages, and a second mass transfer zone laterally spaced and in liquid communication, such that liquid reagent is introduced into the first mass transfer zone and flows through the first mass transfer zone in intimate contact with the process gas, and the liquid reagent flows from the first mass transfer zone, through the second mass transfer zone for intimate contact with the second gas in said second mass transfer zone, said liquid reagent flowing through the second mass transfer zone in intimate contact with the second gas and flowing out of the second mass transfer zone through a liquid reagent outlet and including means for separating gases present in one mass transfer zone from gases present in the other mass transfer zone, the improvement comprising:

said second mass transfer zone including one or more mass transfer stages in liquid flow communication, with an upper end of a last mass transfer stage of said second mass transfer zone in fluid communication with a first stage of said first mass transfer zone, through an intermediate flow channel wherein no additional gas is dispersed in the liquid within the intermediate flow channel, and containing a level of liquid reagent in boh mass transfer zones, establishing the flow of said liquids and gases in said two mass transfer zones to flow cocurrently in each of said mass transfer zones; and continuously flowing liquid reagent from said second mass transfer zone into said first mass transfer zone for continuous recirculation of liquid and sequential intimate contact of said liquid reagent with said two gases.

2. In the method of claim 1 wherein the process gas includes hydrogen sulfide gas and said liquid reagent is an oxidation - reduction solution, thereby effecting oxidation of the hydrogen sulfide gas and reduction of the oxidation-reduction solution and to form a reduced oxidation-reduction solution in one of said mass transfer zones and to form elemental sulfur; and wherein the second gas is capable of oxidizing the reduced solution to form an oxidized solution so that the oxidized solution is capable of further absorption of the process gas in the first mass transfer zone.

3. The method of claim 2 wherein the catalytic solution contains a ferric iron chelate that is reduced by hydrogen sulfide gas to a ferrous iron chelate in said first mass transfer zone.

4. In the method of claim 1 including the step of introducing the liquid reagent from the outlet of the second mass transfer zone into a residence chamber for retaining a quantity of the liquid reagent between the first mass transfer zone and the second transfer zone, and continuously flowing the liquid reagent from the residence chamber to the second mass transfer zone at a controlled rate to provide a substantially constant reaction time in the residence chamber to form elemental sulfur in the residence chamber.

5. In the method of claim 4 wherein there is no gas dispersed through the liquid reagent in the residence chamber, except for the first and second gases dissolved in the liquid reagent in the first and second mass transfer zones.

6. A method of contacting a liquid reagent with different gases sequentially in separate mass transfer zones within a single vessel, each mass transfer zone including one or more mass transfer stages sequentially arranged, with an upper end of one mass transfer stage in fluid communication with a lower end of a succeeding mass transfer stage through an intermediate flow channel wherein no additional gas is dispersed in the liquid within the intermediate flow channel comprising:

intimately contacting liquid reagent with a process gas in a first mass transfer zone, said liquid reagent and said process gas flowing cocurrently in said first mass transfer zone to effect mass transfer between said liquid reagent and said process gas, thereby forming a treated gas and a less active liquid reagent;

introducing the less active liquid reagent from the first mass transfer zone into a residence chamber;

flowing the less active liquid reagent from the residence chamber to the second mass transfer zone;

introducing a second gas, different from said process gas, into said second mass transfer zone in cocurrent flow with the less active liquid reagent, thereby effecting mass transfer between said less active liquid reagent and said second gas to form a regenerated, more active liquid reagent; and controlling the rate of flow of the liquid reagent from said residence chamber to said second mass transfer zone to control the amount of mass transfer in said second mass transfer zone.

7. The method of claim 6 wherein the process gas includes a hydrogen sulfide gas contaminant and said liquid reagent is a reducible catalytic oxidation - reduction solution, thereby effecting reduction of the catalytic solution in said first mass transfer zone, to form a reduced catalytic solution and to effect oxidation of the hydrogen sulfide gas, and wherein the second gas is capable of oxidizing the reduced catalytic solution so that the oxidized catalytic solution is capable of further oxidation of the process gas in the first mass transfer zone, to form elemental sulfur.

8. The method of claim 7 wherein the catalytic solution is a ferric iron chelate solution that is reduced by hydrogen-sulfide gas in said first mass transfer zone to a ferrous iron chelate solution.

9. The method of claim 6 wherein there is no gas dispersed through the liquid reagent in the residence chamber, except for gases dissolved in the liquid reagent in the first and second mass transfer zones.

10. The method of claim 6 wherein the second mass transfer zone includes a plurality of mass transfer stages, and further including introducing the second gas into a first stage of the second mass transfer zone in contact with said less active liquid reagent to form a partially active liquid reagent; and contacting the partially active liquid reagent received from the first stage of said second mass transfer zone with the second gas in a second stage of the second mass transfer zone.

11. A method of contacting a liquid with different gases sequentially in separate mass transfer zones, each mass transfer zone including one or more mass transfer stages sequentially arranged, with an upper end of one mass transfer stage in fluid communication with a lower end of a succeeding mass transfer stage through an intermediate flow channel wherein no additional gas is dispersed in the liquid within the intermediate flow channel comprising:

intimately contacting a polyvalent metal redox solution with a process gas in a first mass transfer zone, said polyvalent metal redox solution and said process gas flowing cocurrently in each mass transfer stage of said first mass transfer zone to effect mass transfer between said polyvalent metal redox solution and said process gas, thereby forming a treated gas and a reduced polyvalent metal redox solution;

flowing the reduced polyvalent metal redox solution through a plurality of stages of a second mass transfer zone for intimate contact with a second gas, different from said process gas, in cocurrent flow with the reduced polyvalent metal redox solution in each stage of the second mass transfer zone, and through intermediate flow channels, wherein no additional gas is introduced, said flow channels disposed between each successive stage of said second mass transfer zone to interconnect an upper portion of one mass transfer stage to a lower portion of a succeeding mass transfer stage of said second mass transfer zone, thereby effecting mass transfer between said reduced polyvalent metal redox solution and said second gas to form a regenerated catalytic polyvalent metal redox solution; and controlling the rate of flow of said reduced polyvalent metal redox solution from said first mass transfer zone to the first stage of said second mass transfer zone to control the residence time of said solution for reaction and release of entrained gas.

12. The method of claim 11 further including the step of initially building up the thiosulfate concentration in the catalytic polyvalent metal solution to a level of about 10% to about 20% by weight prior to reaching a steady state operation.

13. Apparatus for effecting mass transfer of a liquid reagent sequentially with two different gases in a separate mass transfer zone for each gas without permitting both gases to contact the same portion of the liquid simultaneously, comprising:

a first mass transfer zone for intimate contact and mass transfer between the liquid reagent and a first gas;

means for directing the liquid reagent and the first gas into the first mass transfer zone in cocurrent flow to form a treated gas and a reacted liquid reagent;

a second mass transfer zone including a plurality of mass transfer stages sequentially arranged, each stage spaced by a quiescent flow channel, a last stage of said second mass transfer zone being in liquid, but not vapor, communication with the first mass transfer zone through a quiescent flow channel, wherein no additional gas is introduced.

means for directing the reacted liquid reagent from the first mass transfer zone into a first stage of said second mass transfer zone through a quiescent reaction chamber adjacent the first mass transfer zone, wherein no additional gas is dispersed, said chamber, disposed between the first and second mass transfer zones;

means for directing a second gas into each stage of the second mass transfer zone in cocurrent flow with the reacted liquid reagent for intimate contact and mass transfer therebetween, said first and second mass transfer zones disposed in a single mass transfer vessel including baffles forming the quiescent flow channels, and defining each stage of said second mass transfer zone, including means to prevent gas from the first mass transfer zone from contacting reacted liquid reagent in the second mass transfer zone;

means operatively connected between the first mass transfer zone and the second mass transfer zone for establishing the flow rate of reacted liquid reagent from the first mass transfer zone to the first stage of the second mass transfer zone, while maintaining continuous operation of both mass transfer zones in a single vessel; and means for circulation of liquid continuously between the mass transfer zones.

14. The apparatus of claim 13 wherein the baffles separating the first and second mass transfer zones are two spaced, overlapping vertical baffles overlapping within the liquid reagent to allow liquid reagent flow between the mass transfer zones while preventing gas introduced into the first mass transfer zone from entering the second mass transfer zone.

15. The apparatus of claim 14 wherein the means for controlling the liquid reagent flow from the first mass transfer zone to the second mass transfer zone includes a residence chamber disposed between the first mass transfer zone and the second mass transfer zone for retaining a supply of liquid sufficient to carry out chemical reactions while maintaining a continuous flow of liquid reagent continuously through said first and second mass transfer zones in a single vessel.

16. The apparatus of claim 15 further including a conduit operatively connected between the residence chamber and the second mass transfer zone, said first mass transfer zone being in liquid communication with both the residence chamber and the second mass transfer zone, said conduit including means for adjusting the flow of said reacted liquid reagent from said residence chamber to said second mass transfer zone.

17. The apparatus of claim 16 wherein the residence chamber includes an inclined floor sloped downwardly toward the conduit for directing elemental sulfur into the conduit for removal from said reacted liquid reagent.

18. The apparatus of claim 16 further including a plurality of stages of said second mass transfer zone in liquid communication, one with the other, for effecting mass transfer between said liquid reagent and said second gas.

19. Apparatus for effecting mass transfer of a liquid sequentially with two different gases in a separate mass transfer zone for each gas without permitting both gases to contact the same portion of the liquid simultaneously, comprising a first mass transfer zone including one or more mass transfer stages in sequential arrangement, for mass transfer between a liquid reagent and a first gas; means for directing liquid reagent and the first gas into the first mass transfer zone in cocurrent flow; a second mass transfer zone including a plurality of mass transfer stages in sequential arrangement, a last stage of said second mass transfer zone in liquid, but not vapor, communication with the first mass transfer zone; means for directing the liquid reagent from the first mass transfer zone into the second mass transfer zone; means for directing a second gas into each stage of the second mass transfer zone, in cocurrent flow with the liquid reagent, for intimate contact and mass transfer therebetween; each stage of said first and second mass transfer zones disposed in a single mass transfer vessel; means for separating each stage of each mass transfer zone, including two closely spaced, overlapping vertical baffles, overlapping within the liquid reagent to allow liquid reagent flow from an upper portion of one mass transfer stage to a lower portion of a succeeding mass transfer stage in each mass transfer zone while preventing gas introduced in one mass transfer stage from entering a succeeding mass transfer stage; a residence chamber disposed between the first mass transfer zone and the second mass transfer zone adapted to retain a supply of liquid reagent from an outlet of the first mass transfer zone to permit completion of chemical reaction, while maintaining continuous flow of liquid reagent between both mass transfer zones in a single vessel; and means operatively associated with the liquid supply in the residence chamber for controlling the flow of liquid from the first mass transfer zone to the second mass transfer zone.

20. The apparatus of claim 19 further including a conduit operatively connected between the residence chamber and the second mass transfer zone, said first mass transfer zone being in fluid communication with both the residence chamber and the second mass transfer zone, said conduit including a valve adapted to adjust the flow of said liquid reagent from said residence chamber to said second mass transfer zone.

21. The apparats of claim 20 wherein the residence chamber includes an inclined floor sloped downwardly toward the conduit for directing elemental sulfur into the conduit for removal from said liquid reagent.

* * * * *